US007336960B2

(12) United States Patent
Zavalkovsky et al.

(10) Patent No.: US 7,336,960 B2
(45) Date of Patent: Feb. 26, 2008

(54) METHOD AND APPARATUS FOR BALANCING WIRELESS ACCESS BASED ON CENTRALIZED INFORMATION

(75) Inventors: Arthur Zavalkovsky, Netanya (IL); Jeremy Stieglitz, Menlo Park, CA (US); Ami Schieber, Ramat-Gan (IL)

(73) Assignee: Cisco Technology, Inc., San Jose, CA (US)

( * ) Notice: Subject to any disclaimer, the term of this patent is extended or adjusted under 35 U.S.C. 154(b) by 246 days.

(21) Appl. No.: 10/974,418

(22) Filed: Oct. 26, 2004

(65) Prior Publication Data

US 2006/0089122 A1 Apr. 27, 2006

(51) Int. Cl.
*H04Q 7/20* (2006.01)
(52) U.S. Cl. ............... 455/453; 455/450; 455/432.1
(58) Field of Classification Search .............. 455/453, 455/450, 432.1, 434, 435.1, 435.2, 435.3
See application file for complete search history.

(56) References Cited

U.S. PATENT DOCUMENTS

| | | | | | |
|---|---|---|---|---|---|
| 5,794,140 | A | * | 8/1998 | Sawyer | 455/408 |
| 5,856,971 | A | * | 1/1999 | Gitlin et al. | 370/335 |
| 5,987,055 | A | * | 11/1999 | Duque-Anton et al. | 455/446 |
| 6,108,552 | A | * | 8/2000 | Edwards et al. | 455/452.1 |
| 6,246,880 | B1 | * | 6/2001 | Iizuka | 455/446 |
| 6,366,780 | B1 | * | 4/2002 | Obhan | 455/453 |
| 6,856,954 | B1 | * | 2/2005 | Su | 455/406 |
| 2004/0215956 | A1 | | 10/2004 | Venkatachary et al. | |
| 2004/0221155 | A1 | | 11/2004 | Venkatachary et al. | |
| 2004/0221157 | A1 | | 11/2004 | Venkatachary et al. | |
| 2004/0224640 | A1 | * | 11/2004 | Baccelli et al. | 455/67.11 |
| 2005/0050010 | A1 | | 3/2005 | Van der Linden | |
| 2006/0062189 | A1 | * | 3/2006 | Takuchi | 370/338 |

* cited by examiner

*Primary Examiner*—Jean Gelin
*Assistant Examiner*—Huy D Nguyen
(74) *Attorney, Agent, or Firm*—Hickman Palermo Truong & Becker LLP (57) ABSTRACT

A method and apparatus for managing and balancing wireless access based on centralized information is provided. A request to provide service to a wireless client is received from a first access node in a plurality of access node. An access policy, applicable to the first access node, is selected from a plurality of stored policies. The stored policies may include a variety of rules, such as how many or which wireless clients may be serviced by an access node. A centralized manager, such as an AAA server, may perform the selection of the access policy. A determination is made as to whether to allow the first access node to provide service to the wireless client based on the selected access policy. A message that instructs the first access node whether to provide or deny service to the wireless client is transmitted to the first access node.

20 Claims, 4 Drawing Sheets

METHOD AND APPARATUS FOR BALANCING WIRELESS ACCESS BASED ON CENTRALIZED INFORMATION

FIELD OF THE INVENTION

The present invention relates to load balancing wireless access to a network.

BACKGROUND

Accessing a network using a wireless connection has gained in popularity in recent years due to its convenience. One approach for accessing a network using a wireless connection is described in the IEEE 802.11 specification. According to this approach, a client transmits a probe request to one or more access points that are within range of the client. An access point (AP) is a component that is configured to provide wireless service to one or more clients. A typical network may have many access points. A probe request is a message sent from a client to an access point to determine if the access point is able to provide service to the client.

After an access point receives a probe request, the access point transmits a probe response to the client. The probe response indicates that the access point sending the probe response to able to provide service to the receiving client.

As a client will typically transmit a probe request to more than one access point, a client will typically receive more than one probe response in return. Each client follows a procedure to determine which access point from which the client should attempt to request service. For example, a client may determine which access point the client should attempt to request service from based on which access point transmitted a probe response with the strongest signal. By connecting to the access point that sent the probe response with the strongest signal, the client improves the likelihood of receiving quality service from an access point.

After a client selects a particular access point from which to receive service, the client transmits a request for service to the particular access point. Thereafter, the particular access point provides service to the client.

Each access point may have a limit on the number of clients that the access point can service. For example, as more clients connect to a particular access point, the demands on the resources of the access point increase. At some point, the access point may not be able to service an additional client without degrading the quality of service provided to clients from that access point to an unacceptable level. Consequently, an access point may deny service to a particular client requesting service if the demands on the resources of the access point exceed an acceptable level.

In order to accommodate as many clients as possible, the designers of a wireless network determine the number and location of access points based on a predicated number and location of clients. For example, the number and location of access points for a company may be determined by estimating the number of clients in a physical location (e.g., a building, floor, or office complex). In such cases, determining the average number of clients per access point can be easily predicted as the number and location of the clients is known.

There are situations, however, when it is difficult to predetermine how many clients will need access to the network. For example, it is difficult to determine how many clients will need access during conventions, press conferences, hot-spots, and other non-regular events. In such situations, a client may not be able to gain access to the network because the demand on the available access points in that location is too great. This problem is especially troublesome if the client requesting wireless access has a special need for access, e.g., the client may be involved in a presentation during the convention in which wireless access is required.

Further, even if additional access points are added to a physical location for a non-regular event, such as a convention, clients may still not be able to obtain the service they require. As clients typically employ the same or similar procedure to determine from which access point to request service, it is possible that even if a number of access points are added to support a particular location, each client in that location may still attempt to request service from the same access point, e.g., each client will attempt to request service from the access point that responds to a probe request with the strongest signal. Thus, the majority of clients at the same location will attempt to request service from a single access point, even if other access points are available. This access point will eventually get overloaded with requests from clients, causing service provided by that access point to degrade in quality. Further, as clients typically employ the same or similar procedure to determine from which access point to request service, every client that is denied service from one access point will likely attempt to connect to a second access node, which may exceed the capabilities of the second access node as well.

Consequently, an approach for providing load balanced wireless access to a network, without incurring the disadvantages of prior approaches, is desirable. The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments described herein are illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the embodiments described herein. It will be apparent, however, that the embodiments described herein may be practiced without these specific details. In other instances, well-known structures and devices are shown in block diagram form in order to avoid unnecessarily obscuring the embodiments described herein.

Functional Overview

An approach for managing and balancing wireless access based on centralized information is disclosed. According to an embodiment, a request to provide service to a wireless client is received, by a centralized manager, from a first access node in a plurality of access nodes. Each access node of the plurality of access nodes is configured to provide wireless service to one or more clients. The centralized manager may be implemented in an embodiment by an AAA server.

The centralized manager selects an access policy, applicable to the first access node, from a plurality of stored policies. The centralized manager determines whether to allow the first access node to provide service to the wireless client based on the selected access policy.

Upon determining that the selected access policy allows the first access node to provide service to the wireless client, a message that instructs the first access node to provide service to the wireless client is transmitted to the first access node. However, upon determining that the selected access policy does not allow the first access node to provide service to the wireless client, a message that instructs the first access node to deny service to the wireless client is transmitted to the first access node.

Advantageously, embodiments allow the determination as to whether a particular access node should provide service to a particular client to be made based on centralized information stored externally to the access node. The centralized information may be implemented as a set of policies stored at a centralized manager. The policies stored at the centralized manager may includes a variety of rules, such as how many or which wireless clients are able to be serviced by an access node. For example, the set of policies may include a rule that only allow a configurable number of client to connect to a particular access node (for example, only ten wireless clients may connect to access node 2) or a rule that only allows a particular client (such as a client associated with a CEO of a company) to connect to a particular access node.

Architecture Overview

Figure 1:
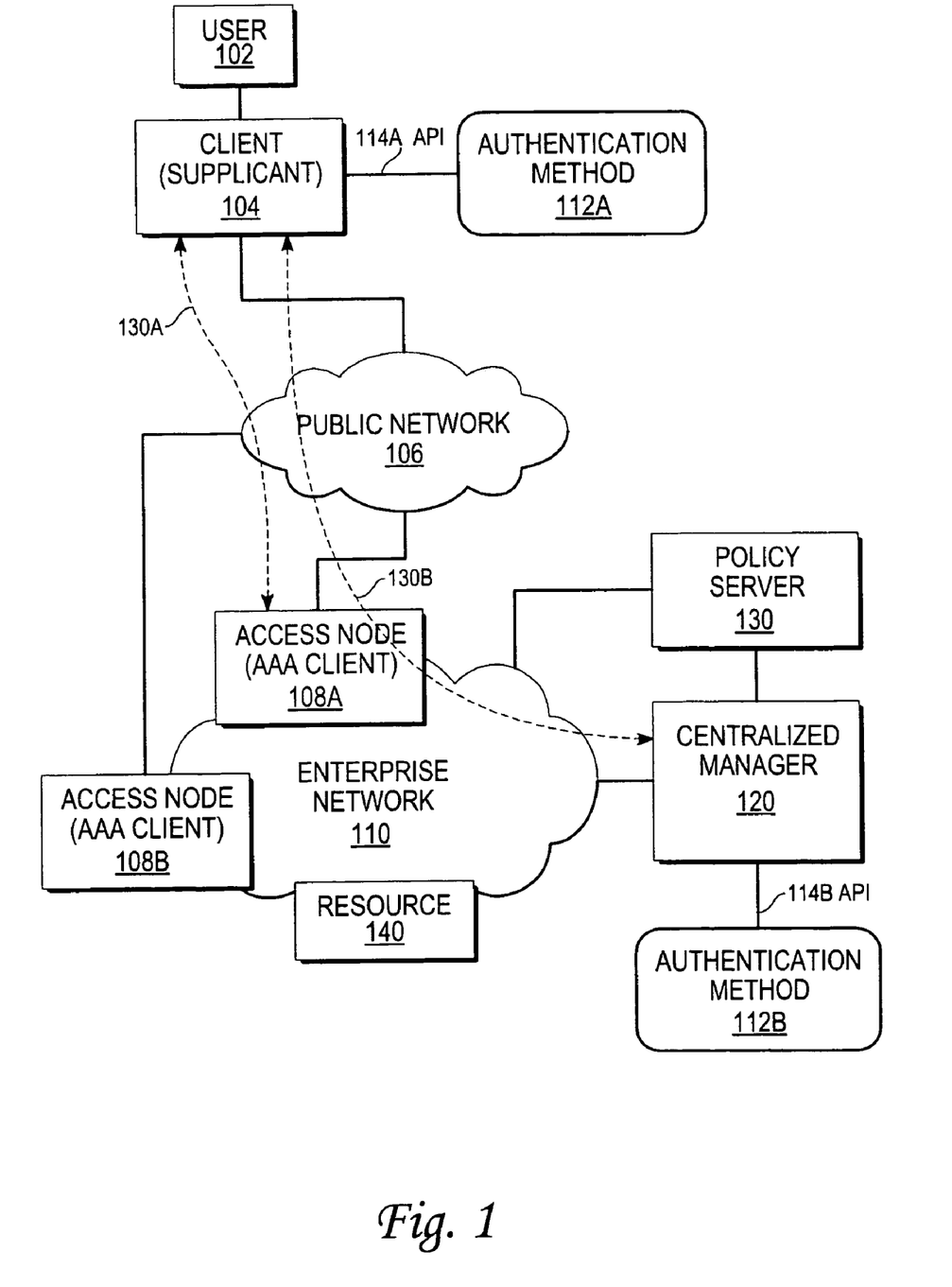
FIG. 1 is a block diagram that illustrates an example network arrangement in that an embodiment may be implemented.

FIG. 1 is a block diagram that illustrates an example wireless network arrangement in which an embodiment may be implemented. A user 102 is associated with a client 104 that is communicatively coupled to a public network 106 and indirectly communicatively coupled to an enterprise network 110. Either public network 106 or enterprise network 110 may be a wireless network.

Wireless networks may that use the 802.1x protocol for wireless communications commonly use some form of user authentication protocol. For example, Extensible Authentication Protocol (EAP), as defined in IETF RFC 2284, may be used. In the terminology of the RFC that describes EAP, a client system is termed a "supplicant," and in this description client 104 is such a supplicant. Client 104 may execute, for example, the 802.1x supplicant available from Microsoft.

An access node, such as access node 108A and 108B, controls access to enterprise network 110, in cooperation with centralized manager 120. As used herein, access node refers to an access point (AP). Access node 108A and 108B may each be termed an AAA client because centralized manager 120 services authentication requests of access nodes 108A and 108B. Access nodes 108A and 108B may each be, in one embodiment, a network router that is configured to perform access control functions. An example is Cisco Access Server AS5300, commercially available from Cisco Systems, Inc., San Jose, Calif. The EAP-compliant embodiments described herein may be implemented using any EAP-capable platform, including switches, routers, network elements that support VPN, wireless gateways, firewalls, etc. While only two access nodes, namely 108A and 108B, are illustrated in FIG. 1, those skilled in the art shall appreciate that any number of access nodes may be employed.

Client 104 is any functional component capable of receiving wireless service from an access node. Non-limiting, illustrative examples of a client include a personal computer, a workstation, and a wireless device. Network 106 may be any local area network, wide area network, or one or more internetworks. Enterprise network 110 is any network, including a WLAN, that holds one or more network resources 140 that client 104 is seeking to access. In certain embodiments, networks 106 and 110 may be the same; thus, FIG. 1 is intended to broadly encompass any network arrangement in which an untrusted client 104 is seeking access to a resource 140 that is held in a secure network.

Centralized manager 120 is a server-class computer that is configured to securely store user authentication information such as usernames and passwords, and to perform authentication protocols, algorithms, and supporting processes, such as one-time password (OTP) validation, encryption and decryption, message digest evaluation, etc. Centralized manager 120 may be implemented by a server that performs authentication, authorization, and accounting services, such as provided by an AAA server. A commercial example of centralized manager 120 is CiscoSecure Access Control Server, from Cisco Systems, Inc.

In one embodiment, centralized manager 120 communicates with access nodes 108A and 108B using a secure protocol that is optimized for use in authentication. An example of a suitable protocol is RADIUS.

Centralized manager 120 also may perform the steps of FIG. 2 that are described further detail below.

Optionally a policy server 130 is communicatively coupled to network 110 and/or to centralized manager 120, or is integrated with the centralized manager. The policy server 130 provides a repository of authentication policies that the centralized manager 120 may consult to determine how to interact with client 104. For example, policy server 130 may specify a minimum required authentication method that client 104 must be capable of using for authentication, a particular kind of credential that the client must present in addition to completing successful authentication, etc.

In this arrangement, client 104 must successfully authenticate itself to a particular access node, such as access node 108A, in cooperation with centralized manager 120, to gain access to resource 140. Any of several authentication protocols may be used to perform authentication. An example of a suitable authentication protocol is PEAP, which is an EAP-compliant protocol that is performed as part of establishing a PPP connection between client 104 and access node 108A. In an object-oriented environment, logic that defines messages and actions performed as part of the authentication protocol can be structured as an authentication method 112A that client 104 accesses or calls using an application programming interface (API) 114A. A compatible authentication method 112B is callable by centralized manager 120 using API 114B.

In general, under EAP, when client 104 attempts to access enterprise network 110 using access node 108A, access node 108A contacts the client and requests identity information, which the client provides in a response. Thus, client 104 and access node 108A establish a logical connection 130A. Access node 108A then passes all subsequent messages involved in the authentication protocol, and issued by client 104, to centralized manager 120, and forwards related messages directed from the authentication server to the client. Accordingly, client 104 and centralized manager 120 effectively establish a logical connection 130B until the authentication protocol terminates. As a result, centralized manager 120 can use authentication method 112B to determine its authentication behavior since it represents the logical endpoint of the authentication protocol conversation.

Balancing Wireless Access

Figure 2:
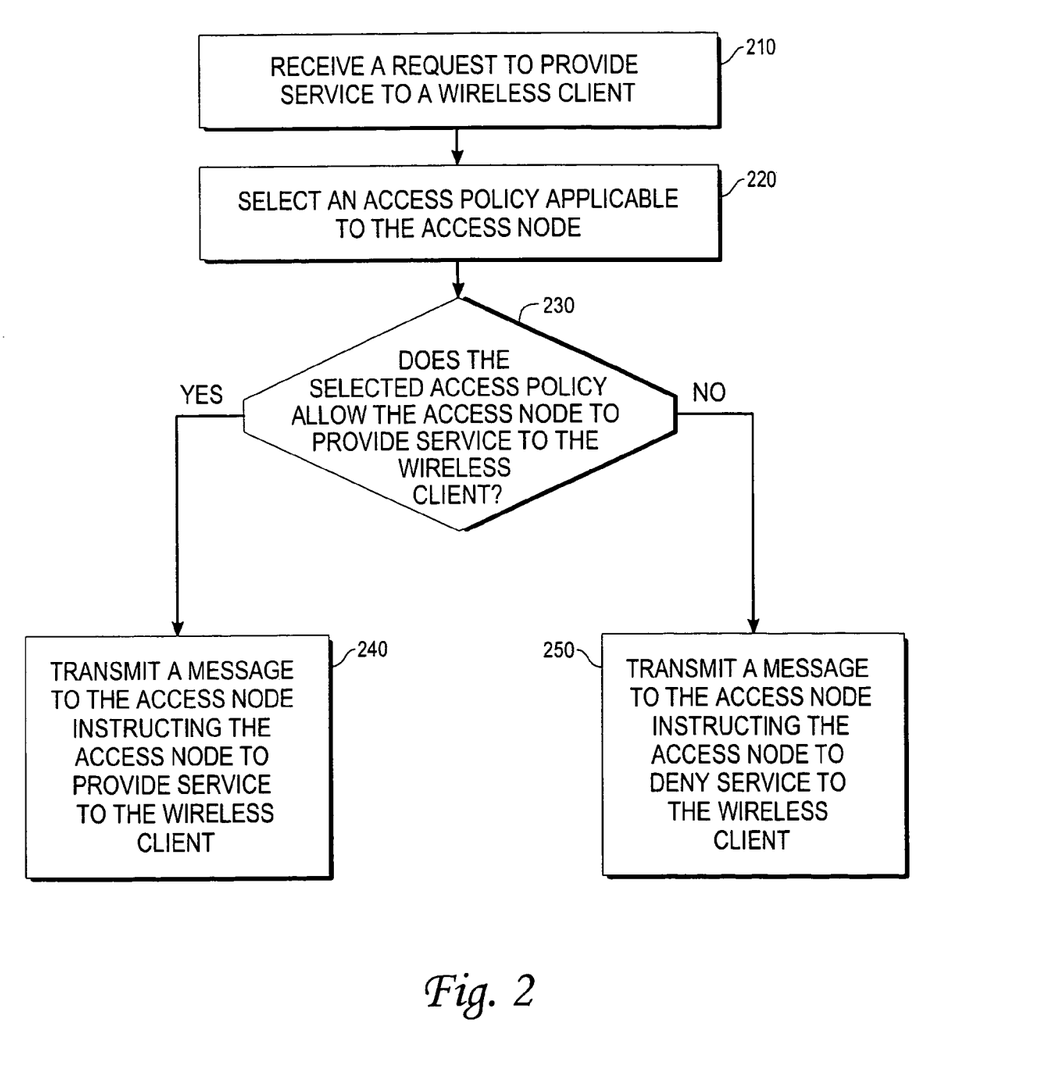
FIG. 2 is a flowchart illustrating the functional steps of an embodiment.

FIG. 2 is a flowchart illustrating the functional steps of an embodiment. By performing the steps of FIG. 2, a determination of whether a particular access node should provide service to a particular client is made based on centralized information stored externally to the access node. The centralized information is stored, in an embodiment, at a centralized manager. The steps of FIG. 2 shall be explained below with reference to FIG. 3, which is a block diagram that illustrates functional components of an embodiment.

Initially, in step 210, a request to provide service to a wireless client is received. The request of step 210 may be sent from an access node (referred to herein as "the requesting access node") in response to the access node receiving a request for service from the wireless client. A centralized manager may receive the request of step 210.

Figure 3:
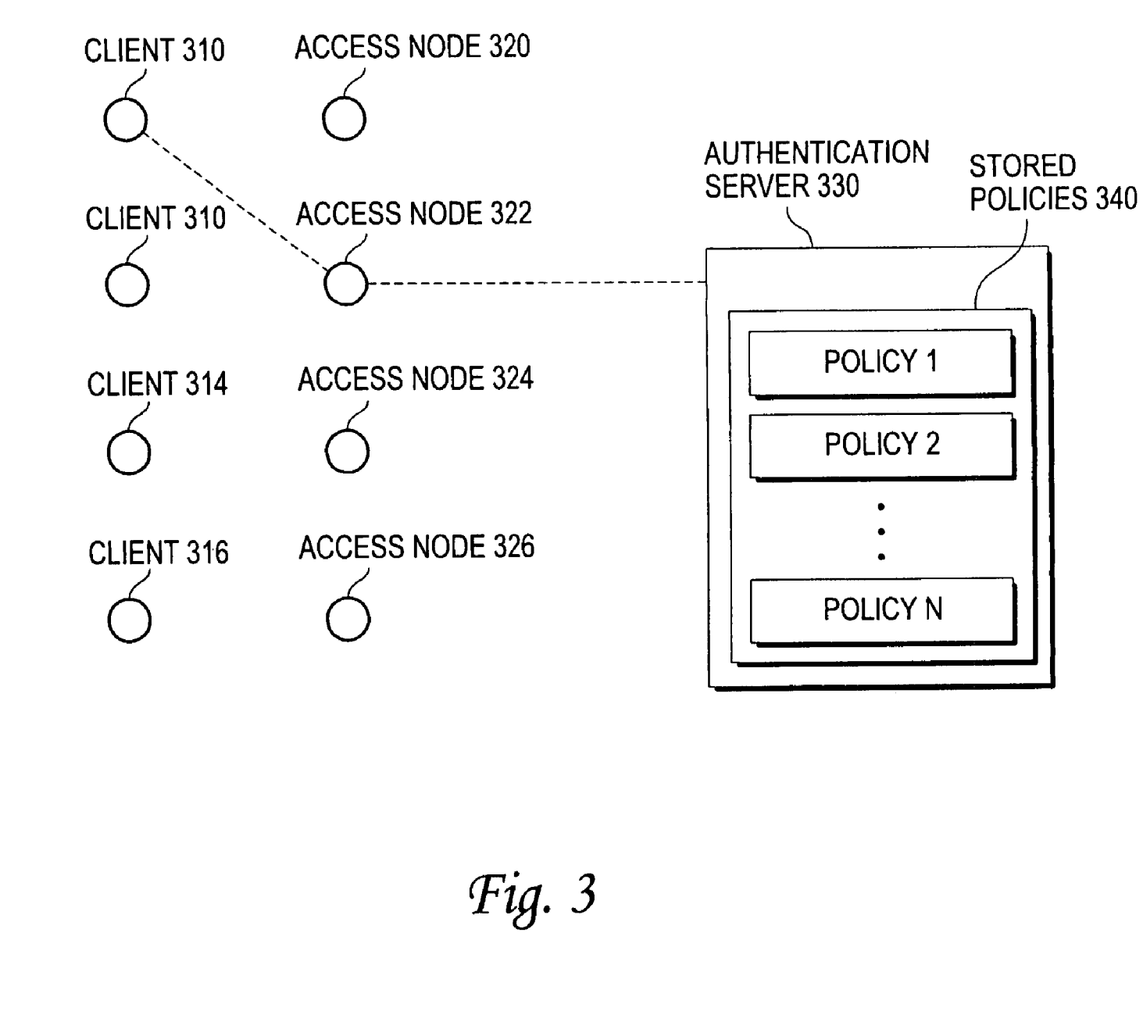
FIG. 3 is a block diagram that illustrates functional components of an illustrative embodiment.

For example, FIG. 3 illustrates a plurality of clients (clients 310, 312, 314, and 316), a plurality of access nodes (access nodes 320, 322, 324, and 326), and centralized manager 330. Step 210 may be performed by centralized manager 330 receiving a request to provide service to client 310 from access node 322. After the performance of step 210, processing proceeds to step 220.

In step 220, an access policy that is applicable to the first access node is selected. The centralized manager 330 may perform the selection of step 220 by selecting an access policy ("the selected access policy") from among a plurality of policies stored at or accessible to the centralized manager 330. For example, as shown FIG. 3, centralized manager 330 comprises stored polices 340, which may contain any number of policies. Additionally, the selected access policy may be selected from among a set of stored policies that may be, in whole or in part, stored at a policy server (not depicted in FIG. 3) accessible to centralized manager 330.

The purpose of the policies is to define one or more rules that may be used to determine whether to allow an access node to provide service to a wireless client. A policy is applicable to a particular access node if the policy assists the determination of whether to allow the particular access node to provide service to a wireless client, e.g., the policy may contain one or more rules that are associated with the particular access node to which the policy is applicable.

The selection of the selected access policy may be performed based on access node identity information contained in the request received in step 210. Access node identity information is information that identifies the access node that sent the request of step 210. For example, in the above example, access node identity information would identify access node 322 since access node 322 sent the request of step 210 to centralized manager 330.

As shown in FIG. 3, centralized manager 330 stores N number of policies (where N is any number). Step 220 may be performed by centralized manager 330 selecting policy 2 to service the request sent from access node 322. Centralized manager 330 may select policy 2 in this example because policy 2 may contain one or more rules that are associated with access node 322. Centralized manager 330 may select a policy based upon which of the stored polices are associated with an access node identified by the access node identity information. After the performance of step 220, processing proceeds to step 230.

In step 230, a determination is made as to whether to allow the requesting access node to provide service to the wireless client based on the selected access policy that was selected in step 220. In the above example, centralized manager 330 may perform step 230 by determining whether to allow access node 322 to provide service to wireless client 310 based on policy 2, which was selected in step 220.

Each policy may include one or more rules that describe whether one or more access nodes are allowed to provide service to one or more wireless clients based on a set of criteria. The set of criteria considered by each policy may vary. For example, the set of criteria may be based on characteristics of the user of the wireless client or on environmental considerations.

In one embodiment, a policy may comprise, at least in part, one or more rules about how many wireless clients are able to be serviced by one or more access nodes. For example, a policy may be established wherein a particular access node may only service 10 wireless clients. Once the particular access node is servicing 10 clients, any received requests to provide service to an additional client from that particular access node will be denied by the policy. In such a policy, the number of wireless clients that may be serviced by an access node may be a configurable number, e.g., an administrator of centralized manager 330 may configure the policy to change the number of wireless clients that a particular access node is allowed to service.

In another embodiment, a policy may comprise, at least in part, one or more rules about which wireless clients may be serviced by one or more access nodes. For example, a policy may be established wherein only a particular wireless client that is associated with a specific individual, such as the CEO of a company, may be serviced by a particular access node.

Information about the user of a client or the client itself may be contained within client identification data contained within the request received in step 210. Client identification data is data that identifies one or more characteristics about the wireless client, or user of the wireless client, requesting service from an access node. The policy may base the decision whether to allow a particular access node to provide service to the wireless client based on one or more characteristics identified in the client identification data. For example, the policy may base the decision whether to allow a particular access node to provide service to the wireless client based on one or more of the following characteristics identified in the client identification data: the identity of the user, a position associated with the user of the wireless client, or an organizational group associated with the user of the wireless client.

In another embodiment, a policy may comprise, at least in part, one or more rules about when one or more of a plurality of wireless clients are able to be serviced by one or more access nodes. For example, a policy may be established wherein one or more access nodes are only allowed to service clients between the hours of 9AM to 5PM, Monday to Friday. Any temporal restrictions may be established on a particular access node.

In another embodiment, access nodes may be logically grouped together into a group. Data that identifies one or more access nodes as belong to a group may be stored, e.g., centralized manager 330 may store group data that identifies one or more access nodes as belonging to a group. A group of access nodes may be based on characteristics of the access nodes in the group. For example, each access node in a group may be physically located near each other, may each be assigned to a particular task or function, or each may share similar functional capabilities. Policies may be configured to include one or more rules that consider the group data.

For example, a policy may comprise, at least in part, one or more rules about whether to allow a first access node to provide service to the wireless client based on how many other wireless clients are being serviced by access nodes in a group associated with the first access node. If the first access node is approaching, but has not reached, peak capacity, and there are other access nodes in a group associated with the first access node that are capable of providing service to the wireless client identified in the request received in step 210, then the policy may deny the first access node from providing service to the wireless client, based on the assumption that one of the other access nodes in the group will provide service to the wireless client. The above policy is merely illustrative, as other embodiments may employ other policies that include one or more rules about whether to allow the requesting access node to provide service to a wireless client based on other considerations about the group of the requesting access node.

In another embodiment, a policy may comprise, at least in part, one or more rules about whether to allow the first access node to provide service to the wireless client based on data describing how much bandwidth is being consumed at the first access node. For example, centralized manager 330 may store data that describing how much bandwidth is being consumed at each of a plurality of access nodes. Each access node may transmit information to the centralized manager 330 about how much bandwidth is being consumed at the access node. Such information may be obtained in a variety of formats, e.g., it could be included in the request received in step 210, it may be sent by an access node periodically and asynchronously to the request received in step 210, or centralized manager 330 may periodically poll each access node.

While several embodiments featuring various policies are described above, it should be understood to those in the art that the polices described herein are merely illustrative, and centralized manager 330 may employ any policy to determine whether to allow the requesting access node to provide service to the wireless client associated with the request.

If the selected access policy allows the requesting access node to provide service to the wireless client associated with the request, then processing proceeds to step 240. However, if the selected access policy does not allow the requesting access node to provide service to the wireless client associated with the request, then processing proceeds to step 250.

In step 240, upon determining that the selected access policy allows the requesting access node to provide service to the wireless client, a message is transmitted from centralized manager 330 to the requesting access node that instructs the requesting access node to provide service to the wireless client. After the requesting access node receives the message, the first access node may provide service to the wireless client. In the above example, step 240 may be performed by centralized manager 330 transmitting to access node 322 a message that instructs access node 322 to provide service to client 310.

In step 250, upon determining that the selected access policy does not allow the requesting access node to provide service to the wireless client, a message is transmitted from centralized manager 330 to the requesting access node that instructs the requesting access node to deny service to the wireless client. After the requesting access node receives the message, the requesting access node transmits a second message to the wireless client requesting service to indicate to the wireless client that service is being denied. In the above example, step 250 may be performed by centralized manager 330 transmitting to access node 322 a message that instructs access node 322 to deny service to client 310.

In an embodiment, once service is denied to a wireless client by a particular access node, the wireless client stores data that identifies that the particular access node denied service. The stored data may be used by the wireless device in determining which access node the wireless device should to attempt to connect next. The wireless device uses an algorithm to determine which access node to connect to, but ignores any access node that has already denied service to the wireless device, to ensure that the wireless device does not continue to attempt to the same access node. Once the wireless device determines which access node to attempt to connect to next ("the second access node"), the wireless device may transmit a request for service to the second access node. The second access node may transmit, to centralized manager 330, a request to provide service to the wireless client. The centralized manager 330 may then repeat the functional steps of FIG. 2 to process the request from the second access node.

Advantageously, embodiments allow the determination as to whether a particular access node should provide service to a particular client to be made based on centralized information stored externally to the access node. Using embodiments of the invention, a network administrator may define load balancing and quality of service (QOS) policies for wireless networks. Thus, the stored polices of the centralized manager may be based on load-balancing or QOS considerations, in addition to traditional AAA polices, such as authentication, authorization, and accounting polices.

Pre-Authentication Messages

The IEEE 802.11i security standard has defined an optional association phase called "pre-authentication." Pre-authentication is designed to allow a supplicant to establish security associations with multiple access nodes before establishing a direct association to a particular access node. Pre-authentication advantageously improves the performance of re-associating a supplicant to a new access node in a mobile environment, as the new access node need not perform the full protocol overhead of a full re-authentication of the supplicant.

As used herein, a "pre-authentication message" refers to a request, sent from a client to one or more access nodes, to establish a security association between the sending client and the receiving access node. For example, 200 people may be located in a particular area for a meeting. Each of the 200 people may try to connect to a network using a wireless device. Each of the 200 wireless devices may transmit a pre-authentication message to 5 different access nodes.

When a particular access node receives a pre-authentication message, the particular access node communicates with centralized manager 120 to inform the centralized manager 120 that the particular node received the pre-authentication message. The centralized manager 120 may, in turn, determine how to process the pre-authentication message received by the particular access node based on one or more policies. In an embodiment, the centralized manager 120 may determine how to process the pre-authentication message received by the particular node based on one or more policies, stored at or accessible to the centralized manager, that consider information concerning pre-authenticating messages received at access nodes. After the centralized manager 120 determines how to process the pre-authentication request based on the one or more policies, the centralized manager 120 communicates the decision to the particular access node that received the pre-authentication message.

As explained above, the centralized manager 120 may determine may consult one or more polices when processing a request, sent from an access node, to provide service to a client. When processing a request to provide service to a client, the centralized manager 120 may consult one or more polices that comprise one or more rules that consider information concerning pre-authenticating messages received at access nodes.

Embodiments of the invention may employ a centralized manager 120 that selects an access policy that comprises one or more rules that consider pre-authentication messages received by access nodes. For example, a policy may be established that attempts to minimize the load on a network by assessing a set of pre-authentication messages that have been received at an access node, and attempting to evenly distribute the amount of clients that are either authorized or pre-authorized to receive service at a particular node based on the set of pre-authentication messages received at access nodes. In the above example involving 200 people, if each of the 200 wireless clients transmits a pre-authentication message to 5 different access nodes, and thereafter the centralized manager 120 receives notification from a set of access nodes that 1000 (200*5) pre-authentication messages have been received, then the centralized manager 120 may communicate to the set of access nodes that 5 particular access nodes may pre-authenticate 40 wireless clients. Other polices that consider pre-authentication messages received by access nodes may be employed by other embodiments which attempt to optimally grant or deny service to client from an access point based on the pre-authentication messaged received by access nodes.

Implementing Mechanisms

Figure 4:
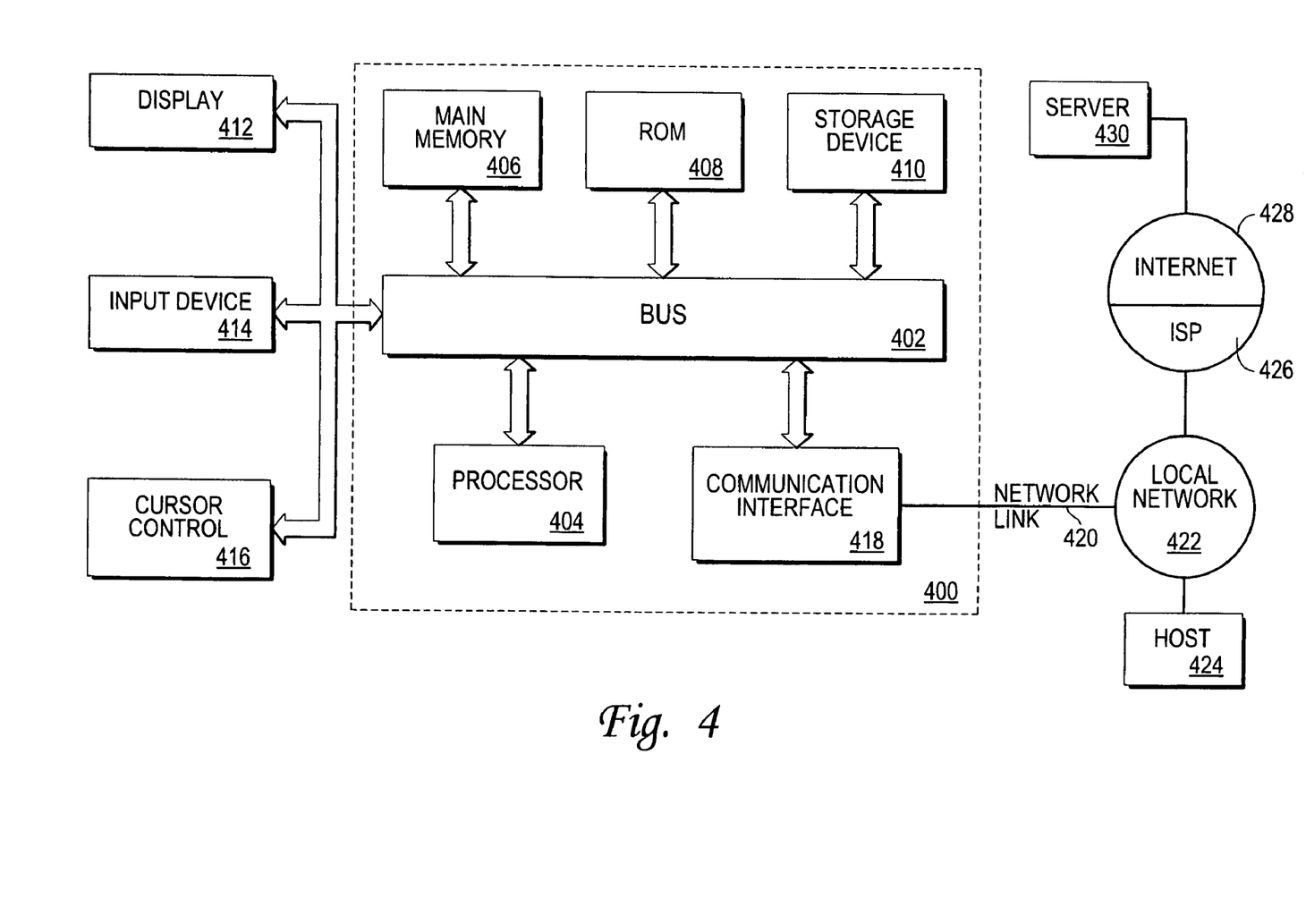
FIG. 4 is a block diagram that illustrates a computer system upon which an embodiment may be implemented.

Client 104, access node 108A and 108B, centralized manager 120, and policy server 130 may each, in an embodiment, be implemented on a computer system. FIG. 4 is a block diagram that illustrates a computer system 400 upon which an embodiment may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A machine-implemented method, comprising:
   receiving, from a first access node in a plurality of access nodes, a request to provide service to a wireless client, wherein each of said plurality of access nodes is configured to provide wireless service to one or more clients;
   selecting, from among a plurality of stored policies, a first access policy applicable to said first access node;
   wherein said first access policy comprises, at least in part, one or more rules about whether to allow said first access node to provide service to said wireless client based on how many other wireless clients are being serviced by a set of access nodes associated with said first access node;
   determining whether to allow said first access node to provide service to said wireless client based on said first access policy;
   upon determining that said first access policy allows said first access node to provide service to said wireless client, transmitting a first message, to said first access node, that instructs said first access node to provide service to said wireless client; and
   upon determining that said first access policy does not allow said first access node to provide service to said wireless client, transmitting a second message, to said first access node, that instructs said first access node to deny service to said wireless client.

2. The method of claim 1, further comprising the steps of:
   receiving, from a second access node in said plurality of access nodes, a second request to provide service to said wireless client;
   selecting, from among said plurality of stored policies, a second access policy applicable to said second access node
   determining whether to allow said second access node to provide service to said wireless client based on said second access policy;
   upon determining that said second access policy allows said second access node to provide service to said wireless client, transmitting a third message, to said second access node, that instructs said second access node to provide service to said wireless client; and
   upon determining that said second access policy does not allow said second access node to provide service to said wireless client, transmitting a fourth message, to said second access node, that instructs said second access node to deny service to said wireless client.

3. The method of claim 1, wherein said first access policy comprises, at least in part, one or more rules about how many wireless clients are able to be serviced by one or more of said plurality of access nodes.

4. The method of claim 1, wherein said first access policy comprises, at least in part, one or more rules about when one or more of a plurality of wireless clients are able to be serviced by one or more of said plurality of access nodes.

5. The method of claim 1, wherein said first access policy comprises, at least in part, one or more rules about whether to allow said first access node to provide service to said wireless client based on data describing how much bandwidth is being consumed at said first access node.

6. A machine-readable medium carrying one or more sequences of instructions, wherein execution of the one or more sequences of instructions by one or more processors causes the one or more processors to perform the steps of, comprising:
   receiving, from a first access node in a plurality of access nodes, a request to provide service to a wireless client, wherein each of said plurality of access nodes is configured to provide wireless service to one or more clients;
   selecting, from among a plurality of stored policies, a first access policy applicable to said first access node;
   wherein said first access policy comprises, at least in part, one or more rules about whether to allow said first access node to provide service to said wireless client based on how many other wireless clients are being serviced by a set of access nodes associated with said first access node;
determining whether to allow said first access node to provide service to said wireless client based on said first access policy;
upon determining that said first access policy allows said first access node to provide service to said wireless client, transmitting a first message, to said first access node, that instructs said first access node to provide service to said wireless client; and
upon determining that said first access policy does not allow said first access node to provide service to said wireless client, transmitting a second message, to said first access node, that instructs said first access node to deny service to said wireless client.

7. The machine-readable medium of claim 6, wherein execution of the one or more sequences of instructions by the one or more processors further causes the one or more processors to perform the steps of:
receiving, from a second access node in said plurality of access nodes, a second request to provide service to said wireless client;
selecting, from among said plurality of stored policies, a second access policy applicable to said second access node
determining whether to allow said second access node to provide service to said wireless client based on said second access policy;
upon determining that said second access policy allows said second access node to provide service to said wireless client, transmitting a third message, to said second access node, that instructs said second access node to provide service to said wireless client; and
upon determining that said second access policy does not allow said second access node to provide service to said wireless client, transmitting a fourth message, to said second access node, that instructs said second access node to deny service to said wireless client.

8. The machine-readable medium of claim 6, wherein said first access policy comprises, at least in part, one or more rules about how many wireless clients are able to be serviced by one or more of said plurality of access nodes.

9. The machine-readable medium of claim 6, wherein said first access policy comprises, at least in part, one or more rules about when one or more of a plurality of wireless clients are able to be serviced by one or more of said plurality of access nodes.

10. The machine-readable medium of claim 6, wherein said first access policy comprises, at least in part, one or more rules about whether to allow said first access node to provide service to said wireless client based on data describing how much bandwidth is being consumed at said first access node.

11. An apparatus, comprising:
means for receiving, from a first access node in a plurality of access nodes, a request to provide service to a wireless client, wherein each of said plurality of access nodes is configured to provide wireless service to one or more clients;
means for selecting, from among a plurality of stored policies, a first access policy applicable to said first access node;
wherein said first access policy comprises, at least in part, one or more rules about whether to allow said first access node to provide service to said wireless client based on how many other wireless clients are being serviced by a set of access nodes associated with said first access node;
means for determining whether to allow said first access node to provide service to said wireless client based on said first access policy;
means for transmitting a first message, to said first access node, that instructs said first access node to provide service to said wireless client upon determining that said first access policy allows said first access node to provide service to said wireless client; and
means for transmitting a second message, to said first access node, that instructs said first access node to deny service to said wireless client upon determining that said first access policy does not allow said first access node to provide service to said wireless client.

12. The apparatus of claim 11, further comprising:
means for receiving, from a second access node in said plurality of access nodes, a second request to provide service to said wireless client;
means for selecting, from among said plurality of stored policies, a second access policy applicable to said second access node
means for determining whether to allow said second access node to provide service to said wireless client based on said second access policy;
means for transmitting a third message, to said second access node, that instructs said second access node to provide service to said wireless client upon determining that said second access policy allows said second access node to provide service to said wireless client; and
means for transmitting a fourth message, to said second access node, that instructs said second access node to deny service to said wireless client upon determining that said second access policy does not allow said second access node to provide service to said wireless client.

13. The apparatus of claim 11, wherein said first access policy comprises, at least in part, one or more rules about how many wireless clients are able to be serviced by one or more of said plurality of access nodes.

14. The apparatus of claim 11, wherein said first access policy comprises, at least in part, one or more rules about when one or more of a plurality of wireless clients are able to be serviced by one or more of said plurality of access nodes.

15. The apparatus of claim 11, wherein said first access policy comprises, at least in part, one or more rules about whether to allow said first access node to provide service to said wireless client based on data describing how much bandwidth is being consumed at said first access node.

16. An apparatus, comprising:
a network interface that is coupled to the data network for receiving one or more packet flows therefrom;
a processor; and
one or more stored sequences of instructions which, when executed by the processor, cause the processor to carry out:
receiving, from a first access node in a plurality of access nodes, a request to provide service to a wireless client, wherein each of said plurality of access nodes is configured to provide wireless service to one or more clients;

selecting, from among a plurality of stored policies, a first access policy applicable to said first access node;

wherein said first access policy comprises, at least in part, one or more rules about whether to allow said first access node to provide service to said wireless client based on how many other wireless clients are being serviced by a set of access nodes associated with said first access node;

determining whether to allow said first access node to provide service to said wireless client based on said first access policy;

upon determining that said first access policy allows said first access node to provide service to said wireless client, transmitting a first message, to said first access node, that instructs said first access node to provide service to said wireless client; and upon determining that said first access policy does not allow said first access node to provide service to said wireless client, transmitting a second message, to said first access node, that instructs said first access node to deny service to said wireless client.

17. The apparatus of claim 16, comprising further sequences which when executed cause the one or more processors to perform:

receiving, from a second access node in said plurality of access nodes, a second request to provide service to said wireless client;

selecting, from among said plurality of stored policies, a second access policy applicable to said second access node determining whether to allow said second access node to provide service to said wireless client based on said second access policy;

upon determining that said second access policy allows said second access node to provide service to said wireless client, transmitting a third message, to said second access node, that instructs said second access node to provide service to said wireless client; and upon determining that said second access policy does not allow said second access node to provide service to said wireless client, transmitting a fourth message, to said second access node, that instructs said second access node to deny service to said wireless client.

18. The apparatus of claim 16, wherein said first access policy comprises, at least in part, one or more rules about how many wireless clients are able to be serviced by one or more of said plurality of access nodes.

19. The apparatus of claim 16, wherein said first access policy comprises, at least in part, one or more rules about when one or more of a plurality of wireless clients are able to be serviced by one or more of said plurality of access nodes.

20. The apparatus of claim 16, wherein said first access policy comprises, at least in part, one or more rules about whether to allow said first access node to provide service to said wireless client based on data describing how much bandwidth is being consumed at said first access node.

* * * * *